Aug. 7, 1928.
H. SCHUTTE
1,679,789
CLAMP FOR TROLLEY CONDUCTORS
Filed Aug. 6, 1925
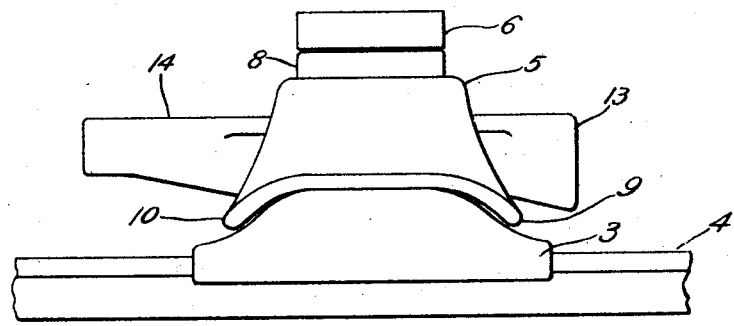
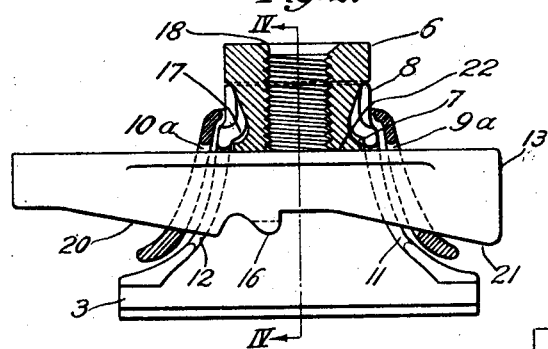
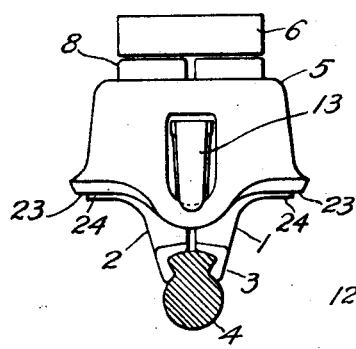
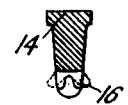
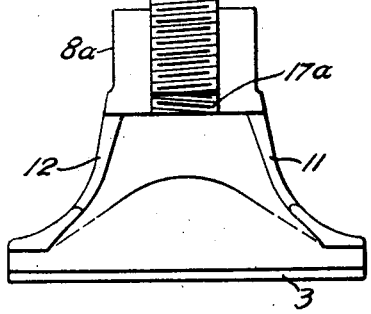
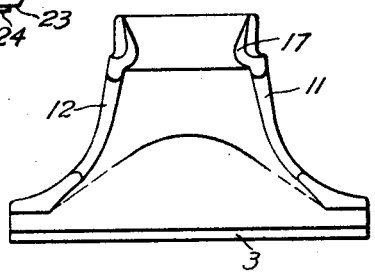
WITNESSES:
Carl J. Loesch
Birney Hines
INVENTOR
Hermann Schutte
BY
Wesley G. Carr
ATTORNEY Patented Aug. 7, 1928.

1,679,789

UNITED STATES PATENT OFFICE.

HERMANN SCHUTTE, OF PITTSBURGH, PENNSYLVANIA.

CLAMP FOR TROLLEY CONDUCTORS.

Application filed August 6, 1925. Serial No. 48,468.

My invention relates to improvements in hangers or clamps for holding and suspending trolley conductors and particularly to means for causing the hanger to securely grip the trolley conductor.

One object of my invention is to provide a simple, cheap and effective device of the above-indicated character which may be readily assembled and disassembled when desired, and which is securely locked or fastened together when in use.

Another object of my invention is to provide a hanger that may be assembled upon, or disassembled from, the trolley conductor without the use of any special tools.

My improvement in hangers, which is hereinafter more fully described, comprises a bell-shaped yoke and a co-operating wedge adapted to hold together in operative position a suspending stem and clamping jaws for gripping a trolley conductor.

One form of my invention is shown in the accompanying drawings forming a part of this specification, in which Figure 1 is a view, in side elevation, of my improved device for holding trolley conductors;

Fig. 2 is a view, in side elevation, omitting one of the clamping members, and showing two parts of the device in section;

Fig. 3 is a rear end view of the device shown in Fig. 1;

Fig. 4 is a view of the wedge, in section, taken along the line IV—IV of Fig. 2; and Fig. 5 is a view, in side elevation, of the inner face of one of the clamping ears;

Fig. 6 is a view, in side elevation, of the inner face of a modified form of one of the clamping ears.

Referring to the drawing, my improved trolley-conductor hanger comprises two clamping ears or shell members 1 and 2 that are provided with lips 3 at their lower extremities adapted to grip a trolley conductor 4. In order to retain the clamping ears 1 and 2 in position, I provide a bell-shaped yoke 5 that is loosely mounted upon the upper portions of the clamping ears. A suitable stem 6 is provided to suspend the hanger and also assist in retaining the clamping ears in proper position. The suspending stem 6 is provided with an outer annular groove 7 near its lower end that is adapted to receive the upper ends 8 of the clamping ears 1 and 2.

The bell-shaped yoke 5 is provided at one side 9 with an aperture 9a, and at the other side 10 with an aperture 10a. It is so mounted upon the clamping ears 1 and 2 that the apertures 9a and 10a are alined with recesses 11 and 12 that are formed in the abutting edges of the clamping ears 1 and 2, thus forming a passage-way adapted to receive a wedge or key 13.

The wedge or key has a comparatively level top portion 14, is wedge-shaped in cross-section, and has an irregular serrated bottom portion. On the under side of the wedge 13 and near its middle portion is located a laterally bifurcated projection 16, as shown in Figs. 2 and 4.

The upper ends 8 of the clamping ears 1 and 2 are suitably tapered to fit into the bell-shaped yoke 5 and their inner surfaces are also provided with annular bosses 17, which fit into the annular groove 7 in the suspending stem 6.

The suspending stem 6 is also provided with a screw-threaded socket 18 by means of which the hanger may be secured to any supporting stud (not shown).

When it is desired to assemble the hanger, the clamping ears 1 and 2 are assembled with their bosses 17 in the annular groove 7 of the suspending stem 6; and these three parts are then placed within the bell-shaped yoke 5 in such manner that the apertures 11 and 12 in the clamping ears 1 and 2 are in alinement with the apertures 9a and 10a in the side portions 9 and 10 of the yoke 5. The key or wedge 13 is then placed in the passageway formed by the apertures 11 and 12 and the apertures 9a and 10a to complete the assembly.

If it is desired to have the illustrated parts remain permanently in their assembled position, the bifurcated portion 16 of the wedge 13 may be spread apart by means of a chisel, so that the ends can not pass through the apertures 9a and 10a. This construction will prevent the wedge from dropping out of the passageway, but will permit it to be driven back and forth within certain limits, in case it is desired to remove or replace the trolley conductor.

When the wedge or key 13 is driven home, the serrated or irregular bottom portions 20 and 21 will come into contact with the lower portions of the sides 9 and 10 of the yoke 5 and thus raise the key 13 to cause its top portion 14 to come into intimate contact with the bottom portion 22 of the suspending stem 6. The suspending stem 6 will thus be forced upwardly and with it the clamping ears 1 and 2, through the engagement of their bosses 17 with the annular groove 7 in the suspending stem. The forcing of the clamping members 1 and 2 farther into the bell-shaped yoke 5 brings the clamping ears closer together, by reason of the co-operating inclined surfaces 23 and 24, and causes the jaws to firmly grip the trolley conductor 4.

The driving home of the wedge also locks the socket or stem 6 against rotation, by reason of its frictional contact with the ears and wedge, and converts the whole hanger into a solid suspension unit, thus eliminating any wear and tear in service as a result of loose parts.

No special tools are required to install the hanger, as any means for hammering the wedge into and out of position may be employed. If the key or wedge is driven home before the trolley conductor 4 is placed between the lips 3, the stem 6 is locked against rotation relative to the hanger, permitting the stem to be screwed to any supporting stud by rotating the hanger as a whole. The key or wedge may then be backed out to free the jaws from the stem for alignment and to insert the trolley conductor, after which all parts may be permanently locked together for service by again driving home the key or wedge.

In Fig. 6 of the drawings, I have shown a modification of my invention. Instead of providing the upper ends 8 of the clamping ears 1 and 2 with inner annular bosses 17 to fit into the annular groove 7 of the suspending stem 6, each ear is provided with a screw-threaded recess 17a so that when the two clamping ears are placed together in operative position, the recesses 17a will form a screw-threaded opening adapted to receive a screw-threaded stud 6a for supporting the hanger and trolley conductor.

While I have illustrated and described a specific form of my invention, it will be understood that modifications thereof may be made without departing from the spirit and scope of the appended claims.

I claim as my invention:

1. A hanger for trolley conductors, comprising clamping ears adapted to receive and clamp a trolley conductor, a supporting member mounted in the upper portions of the ears, a yoke mounted on and movable relatively to the ears, and a wedge engaging said member and so located in the yoke as to lock the parts in operative position.

2. A hanger for trolley conductors comprising clamping ears adapted to receive and clamp a trolley conductor, a suspending stem mounted in the upper portions of the ears, a yoke having apertures in each end and mounted on the ears for retaining them, and a wedge engaging the sides of the yoke and bearing against the bottom of the stem for locking the parts in operative position.

3. A hanger for trolley conductors comprising clamping ears for clamping a trolley conductor, a suspending stem mounted in the upper ends of the ears, a yoke movably mounted on the ears for retaining them, said yoke and ears having engaging inclined surfaces, and a wedge passing through the yoke and engaging a lower portion of the stem for moving the ears and the yoke relatively to increase the clamping action of the ears when the wedge is driven home.

4. A trolley hanger comprising a supporting stem, a two-part clamping ear depending from the stem and provided with lips for clamping a trolley conductor, an independent yoke movably mounted on the ear for retaining the two parts together, and a wedge extending through a passageway in the hanger for locking all the parts in operative position when driven home and having a bifurcated portion adapted to retain it in said passageway.

5. A hanger for trolley conductors, comprising a suspending stem provided with an annular groove, clamping jaws provided with bosses which engage the annular groove in the stem, a bell-shaped yoke movably mounted on the jaws, and a wedge inserted between portions of the yoke and a portion of the stem for locking the parts together.

In testimony whereof, I have hereunto subscribed my name this 14th day of July, 1925.

HERMANN SCHUTTE.